(12) United States Patent
Bickley

(10) Patent No.: US 7,481,102 B2
(45) Date of Patent: Jan. 27, 2009

(54) METHOD AND APPARATUS FOR DETERMINING THE EXTENT OF INTERNAL WEAR IN A FUEL PUMP OF A FUEL SYSTEM

(75) Inventor: Daniel James Bickley, Solihull (GB)

(73) Assignee: Goodrich Control Systems Limited (GB)

( * ) Notice: Subject to any disclaimer, the term of this patent is extended or adjusted under 35 U.S.C. 154(b) by 147 days.

(21) Appl. No.: 11/555,335

(22) Filed: Nov. 1, 2006

(65) Prior Publication Data

US 2007/0107435 A1    May 17, 2007

(30) Foreign Application Priority Data

Nov. 11, 2005  (GB) ................ 0522991.9

(51) Int. Cl.
*G01M 15/00* (2006.01)
(52) U.S. Cl. ................. 73/114.41
(58) Field of Classification Search .......... 73/114.38, 73/114.41, 114.42, 114.43, 114.52
See application file for complete search history.

(56) References Cited

U.S. PATENT DOCUMENTS

| | | | | |
|---|---|---|---|---|
| 4,333,338 | A | * | 6/1982 | Patey et al. ............... 73/114.41 |
| 7,337,761 | B2 | * | 3/2008 | Bickley ................ 123/198 DB |
| 2005/0016176 | A1 | * | 1/2005 | Griffiths et al. ................ 60/734 |
| 2006/0218911 | A1 | * | 10/2006 | Bickley ........................ 60/426 |
| 2006/0236981 | A1 | * | 10/2006 | Bickley ....................... 123/506 |

* cited by examiner

*Primary Examiner*—Eric S McCall
(74) *Attorney, Agent, or Firm*—Andrus, Sceales, Starke & Sawall, LLP

(57) ABSTRACT

A method of operating a fuel system to determine the extent of internal wear of a fuel pump thereof comprises driving the fuel pump, moving a metering valve member to a closed position in which the metering valve bears against a resilient stop, increasing the operating speed of the fuel pump to increase the pressure applied to the metering valve member urging the valve member towards the resilient stop to a point beyond which further movement of the metering valve member occurs, sensing when the further movement of the metering valve member occurs, and sensing the operating speed of the pump at the time when the further movement occurs.

11 Claims, 1 Drawing Sheet

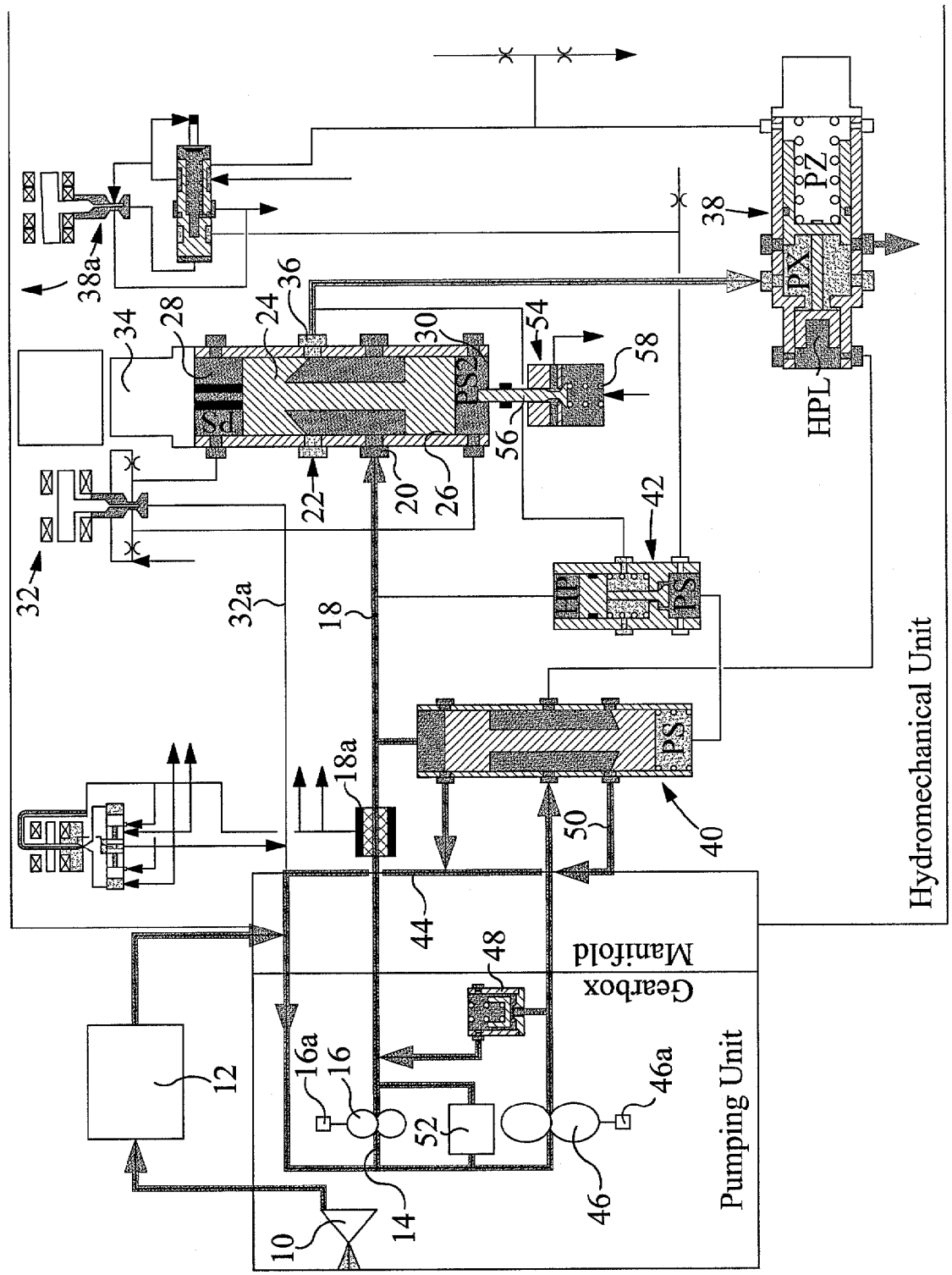

METHOD AND APPARATUS FOR DETERMINING THE EXTENT OF INTERNAL WEAR IN A FUEL PUMP OF A FUEL SYSTEM

FIELD OF THE INVENTION

The invention relates to a fuel system and in particular to a fuel system for use in supplying fuel to an aircraft engine. The invention relates, in particular to a method and apparatus for determining the operating characteristics, and in particular the extent of internal wear, of a fuel pump forming part of such a fuel system.

BACKGROUND OF THE INVENTION

A fuel system for use in the delivery of fuel to an aircraft engine typically comprises a primary constant displacement fuel pump arranged to supply fuel through a metering valve and a pressure raising and shut-off valve to the burners of an engine. A spill valve is arranged to maintain a substantially constant pressure drop across the metering valve by spilling fuel back to the inlet of the fuel pump. In some arrangements, a second pump is arranged to operate in parallel with the aforementioned primary pump to assist the primary pump during high demand phases of the engine operating cycle.

In order to ensure that a fuel pump is serviced or replaced at the optimum time, it is desirable to be able to monitor the extent of internal wear of the fuel pump without requiring the pump to be removed and dismantled.

Techniques are described in EP 1522731, EP 1138933 and U.S. Pat. No. 5,111,653 whereby the wear status of a fuel pump can be sensed by monitoring of the spill valve operation. However, the arrangements all require special designs of spill valve to be used. As a consequence they are unsuitable for retrofitting into existing fuel systems.

SUMMARY OF THE INVENTION

It is an object of the invention to provide a method and apparatus whereby the disadvantages set out above can be overcome.

According to the present invention there is provided a method of operating a fuel system to determine the extent of internal wear of a fuel pump thereof comprising driving the fuel pump, moving a metering valve member to a closed position in which it bears against a resilient stop, increasing the operating speed of the fuel pump to increase the pressure applied to the metering valve member urging it towards the resilient stop to a point beyond which further movement of the metering valve member occurs, sensing when the further movement of the metering valve member occurs, and sensing the operating speed of the pump at the time when said further movement occurs.

The resilient stop is conveniently biased by a spring, and preferably comprises a dump valve.

The further movement of the metering valve member may be sensed by a position sensor used in normal control of the operation of the metering valve.

The said further movement of the metering valve member occurs when the pressure applied thereto exceeds a substantially constant predetermined pressure. By monitoring the operating speed of the pump at which this pressure is attained, an indication as to the extent of internal leakage wear of the pump can be gained.

Conveniently, the sensed operating speed is stored to allow a wear profile of the pump to be built up over time. The stored data may be used to allow estimation of the remaining operating lifetime of the pump and scheduling of its replacement.

Where a wear profile is built up over time, preferably other factors which may effect the pump operating speed required to cause the further movement of the metering valve member, for example altitude and fuel temperature, are taken into account.

The invention also relates to a fuel system comprising a fuel pump operable to supply fuel to a metering valve, the metering valve comprising a valve member movable under the influence of the fuel pressure applied thereto, a resilient stop limiting closing movement of the metering valve member when the pressure applied thereto is less than a predetermined level and allowing further movement of the metering valve member to occur when the applied pressure exceeds the predetermined level, sensor means for sensing said further movement of the metering valve member, and means operable to sense the operating speed of the fuel pump when said further movement of the metering valve member occurs.

The movable stop conveniently comprises a dump valve.

The method of the invention may be incorporated into the normal engine start procedure, and is suitable for retrofitting into existing systems.

BRIEF DESCRIPTION OF THE DRAWINGS

The invention will further be described, by way of example, with reference to the accompanying drawing (FIG. 1) which is a diagram illustrating a fuel system in accordance with an embodiment of the invention.

DETAILED DESCRIPTION OF THE INVENTION

The fuel system illustrated diagrammatically in FIG. 1 comprises a low pressure pump 10 arranged to supply fuel through a filter 12 to the inlet 14 of a primary gear pump 16. The pump 16 supplies fuel through a supply line 18 in which is located a flow washed filter 18a to an inlet port 20 of a metering valve 22.

The metering valve 22 is of substantially conventional form and comprises a valve member in the form of a spool 24 movable within a bore 26 under the influence of the fuel pressures within chambers 28, 30 formed at the ends of the spool 24. A servo valve arrangement 32 is used to control the relative pressures applied to the chambers 28, 30. For example, if it is desired to lift the spool 24, in the orientation illustrated, the chamber 30 is supplied with fuel at a higher pressure than that of chamber 28 by reducing the communication between the chamber 30 and the low pressure in line 32a and increasing the communication between the chamber 28 and the low pressure in line 32a. Conversely, downward movement of the spool 24 is achieved by supplying chamber 28 with fuel at a high pressure than that of chamber 30 by increasing communication between chamber 30 and the low pressure in line 32a and reducing communication between chamber 28 and the low pressure in line 32a. A position sensor 34, for example in the form of an LVDT is provided to monitor the position occupied by the spool 24, the output of the sensor 34 being used in the control of the operation of the servo valve 32 so as to allow the operation of the metering valve 22 to be controlled in a closed-loop fashion.

As illustrated, the metering valve 22 includes an outlet port 36 connected through a pressure raising and shut-off valve 38 to the burners of an aircraft engine. The spool 24 partially obscures the outlet 36, and the rate at which fuel is able to flow through the metering valve 22 is dependent upon the position occupied by the spool 24. It will be appreciated that by lifting the spool 24, the fuel supply rate is increased, downward movement of the spool 24 reducing the fuel supply rate, the spool 24 being movable to a position in which the supply of fuel through the metering valve is terminated.

A combining spill valve arrangement 40 is provided and is operable to maintain a substantially uniform pressure drop across the metering valve 22. In the event that the pressure drop across the metering valve 22 exceeds a predetermined level, a pressure drop control valve 42 causes the combining spill valve 40 to open thereby allowing fuel to escape along a return path 44 back to the inlet 14 of the fuel pump 16.

As illustrated, the fuel system further comprises a second fuel pump 46 arranged to deliver fuel to the filter 18 and metering valve 22 through a non-return valve 48 under certain operating conditions of the engine. When delivery of fuel by the second fuel pump 46 is not required, then fuel delivered thereby is returned through the spill valve 40 and a return passage 50 to the inlet of the pump 16 thus unloading the second pump 46.

A pressure relief valve 52 is provided between the outlet of the pump 16 and the inlet 14 thereof, the pressure relief valve 52 opening in the event of excessive pressures occurring at the outlet of the pump 16 in order to reduce the risk of damage thereto.

The fuel system illustrated in FIG. 1 further comprises a dump valve 54 operable, on engine shut-down, to drain fuel from the burner manifold. The dump valve 54 comprises a valve member 56 movable by the spool 24 of the metering valve 22 when the spool 24 is moved to its fully closed position, such movement of the dump valve member 56 opening the dump valve to allow such escape of fuel. As illustrated, the dump valve member 56 is biased by a spring 58 towards a closed position and so other than when forced to its open position by the spool 24, the dump valve 54 will remain closed.

In normal use of the fuel system, fuel is supplied by the pump 16 through the metering valve 22 and the pressure raising and shut-off valve 38 to the burners of the engine. The pump 16 is driven from an output shaft of the engine and rotates at a speed proportional to engine speed. It will be appreciated, therefore, that the rate of fuel supply by the pump 16 is governed by the speed of operation of the engine. The fuel supply to the engine is controlled by the metering valve 22 which, in turn, is controlled by the operation of the servo valve 32. As described hereinbefore, the combining spill valve 40 together with the operation of the pressure drop control valve 42 maintains a substantially constant pressure drop across the metering valve 22 thus ensuring that the rate at which fuel is supplied by the metering valve 22 is governed by the axial position of the spool 24. During this mode of operation, the fuel system operates substantially conventionally and so further detail of its operation is not included herein.

When it is desired to shut down the engine, the pressure raising and shut-off valve 38 is closed by a shut-off servo valve 38a to terminate fuel supply to the engine burners. The metering valve 22 is also closed by supplying the chamber 28 of the metering valve 22 with fuel under pressure, the chamber 30 being connected to low pressure by the servo valve 32. It will be appreciated that under these circumstances the spool 24 is forced downwardly in the orientation illustrated, thus closing the outlet 36. The operation of moving the spool 24 downwards brings the spool 24 into engagement with the dump valve member 56, forcing the dump valve member 56 away from its seating against the action of the spring 58 and opening the dump valve 54 thereby allowing fuel to escape from the burner manifold. Engine shut down in this manner is, again, substantially conventional and will not be described in further detail.

To start the engine, the engine is turned by an external drive, resulting in the fuel pumps 16, 46 being driven. The fuel pressure to which the combining spill valve 40 is exposed is relatively low so the spill valve 40 occupies a closed position in which the second pump 46 is unloaded and in which none of the fuel supplied by the primary pump 16 and the secondary pump 46 is returned through the lines 44 and 50. The servo valve 32 is held in a position in which the chamber 30 is held at a lower pressure than chamber 28. The chamber 28 is exposed to a pressure related to the pressure of the fuel supplied by the pump 16 to the line 18. It will be appreciated, therefore, that the spool 24 is urged downwardly towards its closed position by the pressure differential. Initially, the difference in pressure is relatively small and so the spool 24, although urged into engagement with the dump valve member 56, is unable to move the dump valve member 56 against the action of the spring 58.

The speed at which the engine, and hence the pump 16, is driven is increased, with the result that the fuel pressure in the line 18, and hence in the chamber 28, increases and a point will be reached at which the pressure applied to the spool 24 is sufficient to overcome the action of the spring 58, thus the spool 24 is able to move further in the downward direction. This movement is accompanied by opening movement of the dump valve member 56 but as no fuel is being supplied to the burners at this point, such operation of the dump valve 54 is of no effect.

The further movement of the spool 24 is sensed by the sensor 34, and the engine/pump operating speed at the time of the further movement being sensed is measured, for example by sensing the operating speed of the engine or the external drive used to rotate the engine at this time, or using sensors 16a, 46a associated with the pumps.

As the force applied by the spring 58 is substantially constant over the working life of the fuel system, it will be appreciated that the technique described hereinbefore can be used to provide an indication of the pump operating speed necessary to develop a substantially fixed pressure. Increases in the required operating speed are representative of internal wear and hence leakage of fuel from the outlet side of the pump, in this case the combination of the primary and secondary pumps and so the leakage could be in either or both of these pumps, to the inlet side thereof.

Although the measured speed may be used directly to provide an indication of the wear status of the pump, it is envisaged to store the measured speed data over time to allow a wear profile to be built up which can be used to monitor pump wear and to allow scheduling of pump replacement at the optimum time. The speed data may be stored with other data which could impact upon the pump operating speed required to develop the required pressure, for example altitude and fuel temperature.

After having sensed the pump wear status, the metering valve 22 can be opened to commence fuel supply to the pressure raising and shut-off valve 38 to allow engine start-up to continue in the usual manner.

Although described as part of the engine start-up procedure, the method could form part of a separate pump test procedure if desired.

It will be appreciated that the invention may be retrofitted or implemented in existing fuel systems without requiring the replacement or modification of significant components thereof. It therefore is of wide ranging application.

A number of modifications or alterations may be made to the arrangement described hereinbefore. For example, although the dump valve conveniently forms the resilient stop, particularly when being retrofitted, arrangements are possible in which a separate spring biased resilient stop is provided. Further, although described as part of a system in which fuel is supplied by a pumping unit having two pumps arranged in parallel to sense the wear status of the pumping unit, the invention is also applicable to single pump systems.

The invention claimed is:

1. A method of operating a fuel system to determine the extent of internal wear of a fuel pump thereof comprising driving the fuel pump, moving a metering valve member to a closed position in which the metering valve member bears against a resilient stop, increasing the operating speed of the fuel pump to increase the pressure applied to the metering valve member urging the metering valve member towards the resilient stop to a point beyond which further movement of the meting valve member occurs, sensing when the further movement of the metering valve member occurs, and sensing the operating speed of the pump at the time when said further movement occurs.

2. A method according to claim 1, wherein the resilient stop is biased by a spring.

3. A method according to claim 1, wherein the resilient stop comprises a dump valve.

4. A method according to claim 1, wherein the further movement of the metering valve member is sensed by a position sensor used in normal control of the operation of the metering valve.

5. A method according to claim 1, wherein the sensed operating speed is stored to allow a wear profile of the pump to be built up over time.

6. A method according to claim 5, wherein the stored data is used to allow estimation of the remaining operating lifetime of the pump and scheduling of replacement of the pump.

7. A method according to claim 5, wherein data representative of other factors which may effect the pump operating speed required to cause the further movement of the metering valve member is stored.

8. A method according to claim 7, wherein the said other factors comprise at least one of altitude and fuel temperature.

9. A fuel system comprising a fuel pump operable to supply fuel to a metering valve, the metering valve comprising a valve member movable under the influence of the fuel pressure applied thereto, a resilient stop limiting closing movement of the metering valve member when the pressure applied thereto is less than a predetermined level and allowing further movement of the metering valve member to occur when the applied pressure exceeds the predetermined level, sensor means for sensing said further movement of the metering valve member, and means operable to sense the operating speed of the fuel pump when said further movement of the metering valve member occurs.

10. A fuel system according to claim 9, wherein the resilient step is spring biased.

11. A fuel system according to claim 9, wherein the resilient stop comprises a dump valve.

* * * * *